United States Patent
Cirrincione et al.

(10) Patent No.: US 9,411,808 B2
(45) Date of Patent: Aug. 9, 2016

(54) AUTOMAPPING OF MUSIC TRACKS TO MUSIC VIDEOS

(71) Applicant: MICROSOFT TECHNOLOGY LICENSING, LLC, Redmond, WA (US)

(72) Inventors: Cory Cirrincione, Bellevue, WA (US); Vignesh Sachidanandam, Mercer Island, WA (US); Alex Savchenko, Bellevue, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 142 days.

(21) Appl. No.: 14/197,142

(22) Filed: Mar. 4, 2014

(65) Prior Publication Data
US 2015/0254242 A1    Sep. 10, 2015

(51) Int. Cl.
| | |
|---|---|
| *G06F 17/30* | (2006.01) |
| *H04L 29/08* | (2006.01) |
| *H04N 21/234* | (2011.01) |
| *H04N 21/262* | (2011.01) |
| *H04N 21/278* | (2011.01) |
| *H04N 21/439* | (2011.01) |

(Continued)

(52) U.S. Cl.
CPC .... *G06F 17/30023* (2013.01); *G06F 17/30053* (2013.01); *H04L 67/1097* (2013.01); *H04N 21/23424* (2013.01); *H04N 21/26258* (2013.01); *H04N 21/278* (2013.01); *H04N 21/4394* (2013.01); *H04N 21/6581* (2013.01); *H04N 21/8113* (2013.01)

(58) Field of Classification Search
CPC ................... G06F 17/30023; G06F 17/30053; H04N 21/23424
USPC .......................... 707/722, 738, 769
See application file for complete search history.

(56) References Cited

U.S. PATENT DOCUMENTS 7,920,931 B2    4/2011  Sluis et al.
8,296,797 B2 * 10/2012  Olstad ............... G06F 17/30796
                                                        725/37

(Continued)

FOREIGN PATENT DOCUMENTS

WO    2013062556 A1    5/2013

OTHER PUBLICATIONS

"International Search Report & Written Opinion Received for PCT Patent Application No. PCT/US2015/017867", Mailed Date: Jun. 25, 2015, (10 Pages total).

*Primary Examiner* — Vincent Boccio
(74) *Attorney, Agent, or Firm* — Bryan Webster; Judy Yee; Micky Minhas

(57) ABSTRACT

A music service remote from a local device user identifies matching video and music content. An identification of a piece of media content that is part of a collection or playlist, is received by the service, the selected piece of media content being included in a unified catalog of video and music content that is accessible by the music service. If the selected piece of media content has a matching member in the unified catalog, the matching member replaces the selected piece of media content during playback of the collection on the local device. The service analyzes a collection of media content associated with the user, the content collection being either i) stored locally on the local device, or ii) stored remotely from the local device in a store that is accessible by the music service, or iii) stored using a combination of local and remote storage.

16 Claims, 15 Drawing Sheets

(51) Int. Cl.
*H04N 21/658* (2011.01)
*H04N 21/81* (2011.01)

(56) References Cited

U.S. PATENT DOCUMENTS

| | | |
|---|---|---|
| 8,391,155 B2 | 3/2013 | Harb |
| 2002/0194619 A1 | 12/2002 | Chang et al. |
| 2006/0141962 A1 | 6/2006 | Forbes et al. |
| 2008/0097970 A1* | 4/2008 | Olstad .............. G06F 17/30796 707/999.003 |
| 2010/0008648 A1 | 1/2010 | Sivakumar et al. |
| 2010/0042682 A1* | 2/2010 | Kaye .................... G11B 27/034 709/203 |
| 2012/0117042 A1 | 5/2012 | Durante et al. |
| 2012/0232681 A1 | 9/2012 | Mundy et al. |
| 2013/0086143 A1 | 4/2013 | Rossetti |

\* cited by examiner

AUTOMAPPING OF MUSIC TRACKS TO MUSIC VIDEOS

BACKGROUND

Multimedia consoles, cellular phones, computers and other types of audio and/or video playback device have become increasingly popular. While such playback devices provide benefits to their users, one problem that exists is that a user must manually search for and locate a video to add it to their playlist in order to include such videos in the playlist playback.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

There exists a need to provide a user with information as to corresponding video availability for an existing collection of audio tracks (including individual music tracks, albums, playlists, etc) and to dynamically playback available corresponding music videos in place of the corresponding audio tracks for the collection of music in an automated manner.

In accordance with one or more aspects, a song in a collection or in a playlist is identified and a determination is made as to whether a music video corresponding to the identified song is available at a remote unified catalog that associates audio tracks with related video. If a music video corresponding to the identified song is not available, then the identified song is played back. However, if a music video corresponding to the identified song is available, then the music video is played back instead of the identified song.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DESCRIPTION OF THE DRAWINGS

Like reference numerals indicate like elements in the drawings. Elements are not drawn to scale unless otherwise indicated.

DETAILED DESCRIPTION

The mapping of music videos to audio tracks, and the automatic dynamic replacement of audio tracks with corresponding music videos during runtime of a user's collection or playlist, is discussed herein.

A playlist is a list of one or more pieces of audio and/or video content that can be played back by a user of computing system, multimedia console, cellular phone, etc. Typically a user generates a playlist, adding both songs and music videos to the playlist as desired. The user can provide various inputs to manually add pieces of audio and/or video content to a playlist, to remove pieces of audio and/or video content from a playlist, to rearrange pieces of audio and/or video content on a playlist, to select a particular playlist for playback, and so forth. A user can also create, store, and retrieve multiple different playlists.

Rather than including the actual audio and/or video content for the songs and music videos, the playlist is typically a list of identifiers (e.g., file names or other identifiers) of the songs and music videos that are included on the playlist.

In one or more embodiments, each piece of audio and/or video content in a playlist is a song or a music video. A song refers to audio content that is played back by a computing system audibly. A music video, on the other hand, refers to both audio content that is played back by the computing system audibly and also corresponding video content that is displayed by the computing system. Various discussions herein refer to songs and music videos, although it should be noted that the techniques discussed herein can alternatively be used with other types of audio and/or video content.

As described in further detail below, a discovery mechanism retrieves metadata to provide an indication to a user that a corresponding video is available for a particular music track. By automatically mapping music tracks to corresponding music videos at a remote music service, during runtime, the music videos dynamically replace the corresponding music tracks on the playlist. In one embodiment, when a music video that corresponds to a song on the playlist is available, the music video is played back rather than the song, but the playlist remains unaltered.

Figure 1:
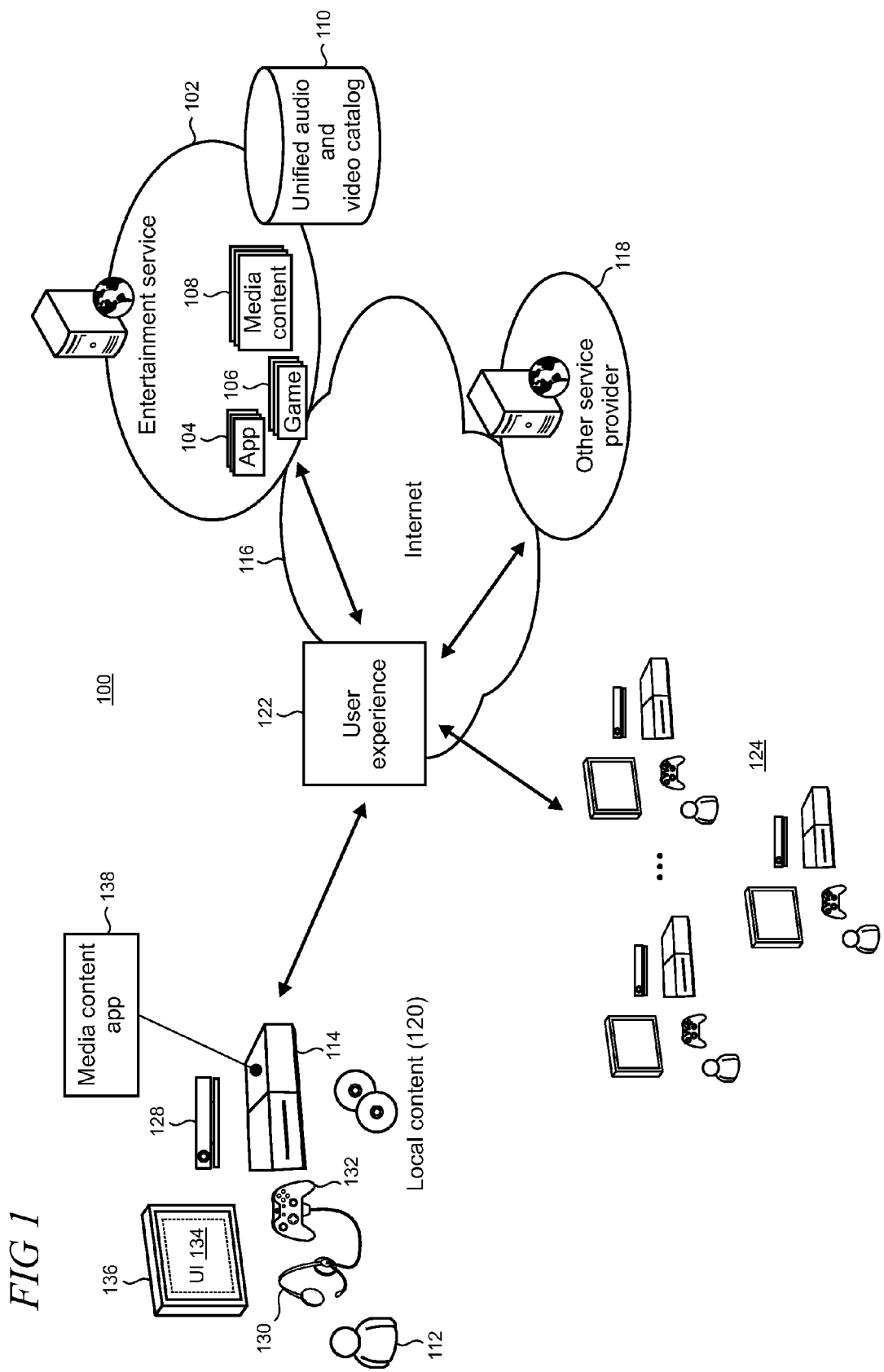
FIG. 1 shows an illustrative computing environment in which the present automapping of video and audio content and substitution of corresponding videos for audio content may be implemented.

FIG. 1 shows an illustrative computing environment 100 in which the present automapping of audio and video content and the automatic runtime replacement of audio content with corresponding video content may be implemented. An entertainment service 102 can typically expose applications ("apps") 104, games 106, and media content 108, such as television shows, movies, music tracks and music videos, to a user 112 of a multimedia console 114 over a network such as the Internet 116. A unified audio and video catalog 110 is part of entertainment service 102. The catalog 110 maintains a database that maps audio tracks to corresponding video content. In addition, other service providers 118 may also be in the environment 100 that can provide various other services such as communication services, financial services, travel services, news and information services, etc. In some implementations, the features, capabilities, and functionalities provided by the multimedia console 114 can be replaced by those supported on other types of computing platforms such as personal computers ("PCs"), smartphones, laptop computers, and the like.

Local content 120, including apps, games, and/or media content including music and music videos, may also be utilized and/or consumed in order to provide a particular user experience in the environment 100. In some cases the local content 120 is obtained from removable sources such as optical discs including DVDs (Digital Versatile Discs) and CDs (Compact Discs) while in others, the local content is downloaded from a remote source and saved locally.

Any type of multimedia device may be implemented to interact with entertainment service 102. Examples of such devices include game consoles, desktop computers, notepad or tablet computers, netbook or laptop computers, server computers, mobile stations, entertainment appliances, set-top boxes communicatively coupled to one or more display devices, televisions, cellular or other wireless phones, automotive computers, wearable devices such as smartwatches and eyewear, and so forth.

When implemented as different devices, these devices can communicate with one another in a variety of different manners. For example, devices can communicate with one another using a variety of different networks, such as the Internet, a local area network (LAN), a public telephone or other phone network, an intranet, other public and/or proprietary networks, combinations thereof, and so forth.

Returning to FIG. 1, the user experience 122 includes playing a song or corresponding video that is part of a playlist, or a selection made by the user, wherein the song/video is hosted remotely by the entertainment service 102. In some cases, the execution of the playback of the song/video uses local or networked content and/or apps as appropriate.

The user 112 can typically interact with the multimedia console 114 using a variety of different interface devices including a camera system 128 that can be used to sense visual commands, motions, and gestures, and a headset 130 or other type of microphone or audio capture device/system. In some cases a microphone and camera can be combined into a single device. The user 112 may also utilize a controller 132 to interact with the multimedia console 114. The controller 132 may include a variety of physical controls including joysticks, a directional pad ("D-pad"), and buttons. One or more triggers and/or bumpers (not shown) may also be incorporated into the controller 126. The user 112 will typically interact with a user interface (UI) 134 that is shown on a display device 136 such as a television or monitor.

It is emphasized that the number of controls utilized and the features and functionalities supported by the user controls implemented in the camera system 128, audio capture system, and controller 132 can vary from what is shown in the environment illustrated in FIG. 1 according to the needs of a particular implementation. In addition, in the description that follows various gestures, button presses, and control manipulations are described. It is noted that those actions are intended to be illustrative. For example, the user may actuate a particular button or control, or perform a particular gesture in order to prompt a system operating on the multimedia console 114 to perform a particular function or task (As used here, the term "system" encompasses the various software (including the software operating system ("OS")), hardware, and firmware components that are instantiated on the multimedia console and its peripheral devices in support of various user experiences that are provided by the console). It will be appreciated that the particular mapping of controls to functions can vary from that described below according to the needs of a particular implementation.

The unified audio and video catalog 110 is located remote from the user 112, at the entertainment service 102, and includes a listing of all audio tracks and videos, and a mapping indicating a correspondence between at least some of the tracks and videos as related to one another.

In addition to utilizing the unified catalog 110 for playlist playback, a user 112 is enabled to browse or search the entire collection of remote audio and video content and playback any item in the catalog 110.

Figure 2:
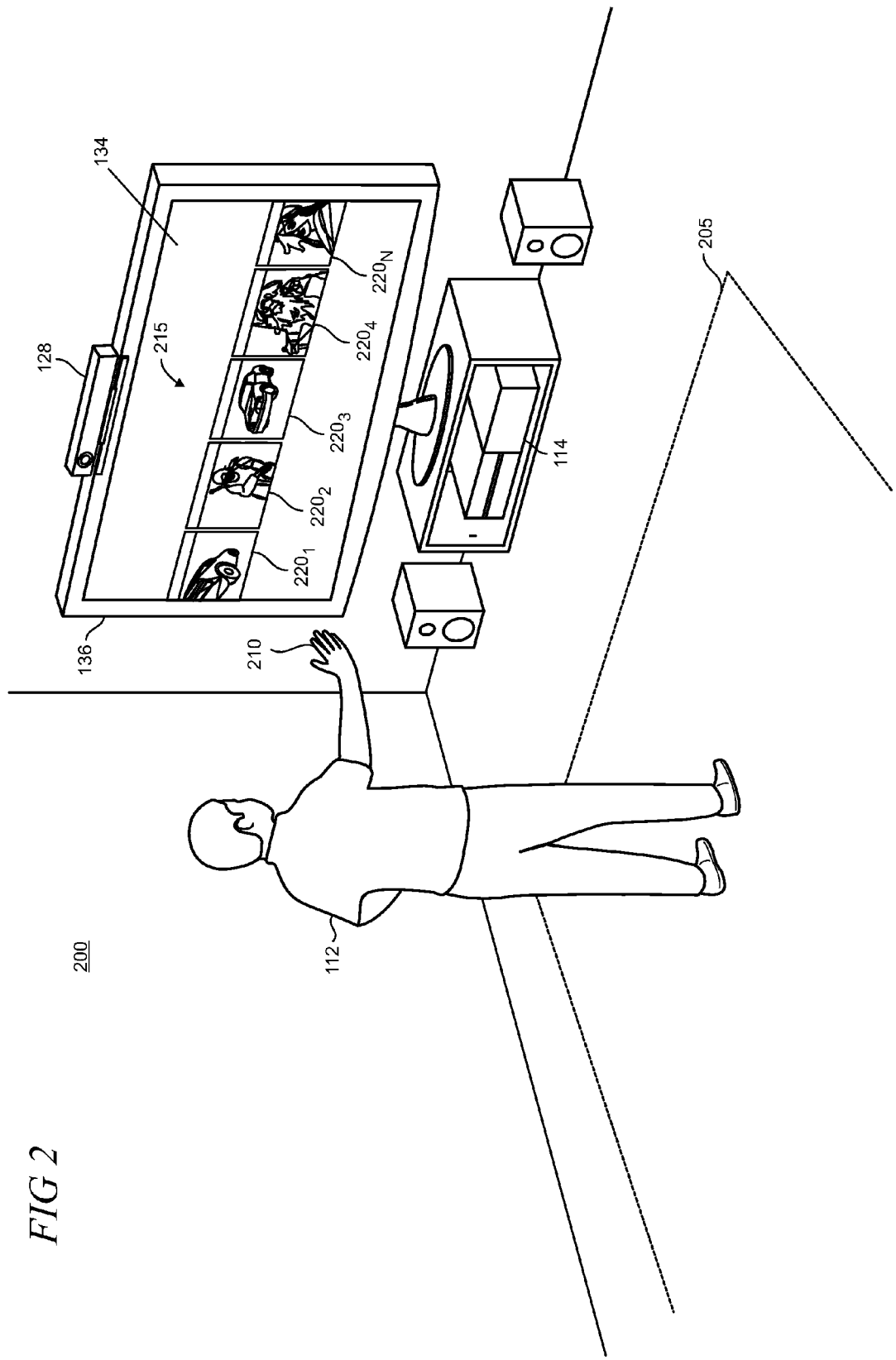
FIG. 2 shows typical user interaction with a multimedia console to view available media content including interaction with a gesture sensor.

FIG. 2 shows an illustrative environment 200 in which the remote unified audio and video catalog may be used to automatically and dynamically replace audio content with corresponding video content in a playlist or collection. As shown, a user 112 interacts with a multimedia device 114 in a typical home. In this illustrative example, the multimedia console 114 is typically configured for running gaming and non-gaming applications using local and/or networked programming and content, playing pre-recorded multimedia such as optical discs including DVDs (Digital Versatile Discs) and CDs (Compact Discs), streaming multimedia (e.g., music and video) from a network, participating in social media, browsing the Internet and other networked media and content, or the like using a coupled audio/visual display such as a television 136.

The multimedia console 114 is operatively coupled to a camera system 128 which may be implemented using one or more video cameras that are configured to visually monitor a physical space that is occupied by the user 112. The camera system 128 is configured to capture, track, and analyze the movements and/or gestures of the user 112 so that they can be used as controls that may be employed to affect, for example, an app or an operating system running on the multimedia console 114. Various motions of the hands 210 or other body parts of the user 112 may correspond to common system-wide tasks such as selecting an audio track or video for playback or other application from a main user interface.

Shown on the illustrative user interface 134 on display device or television 136, is a row 215 of music tracks $220_1$, $220_2, \ldots 220_N$, that may be for example, included in the user's collection or playlist, or may be for example, results of a search of the unified catalog, requested by the user.

Figure 3:
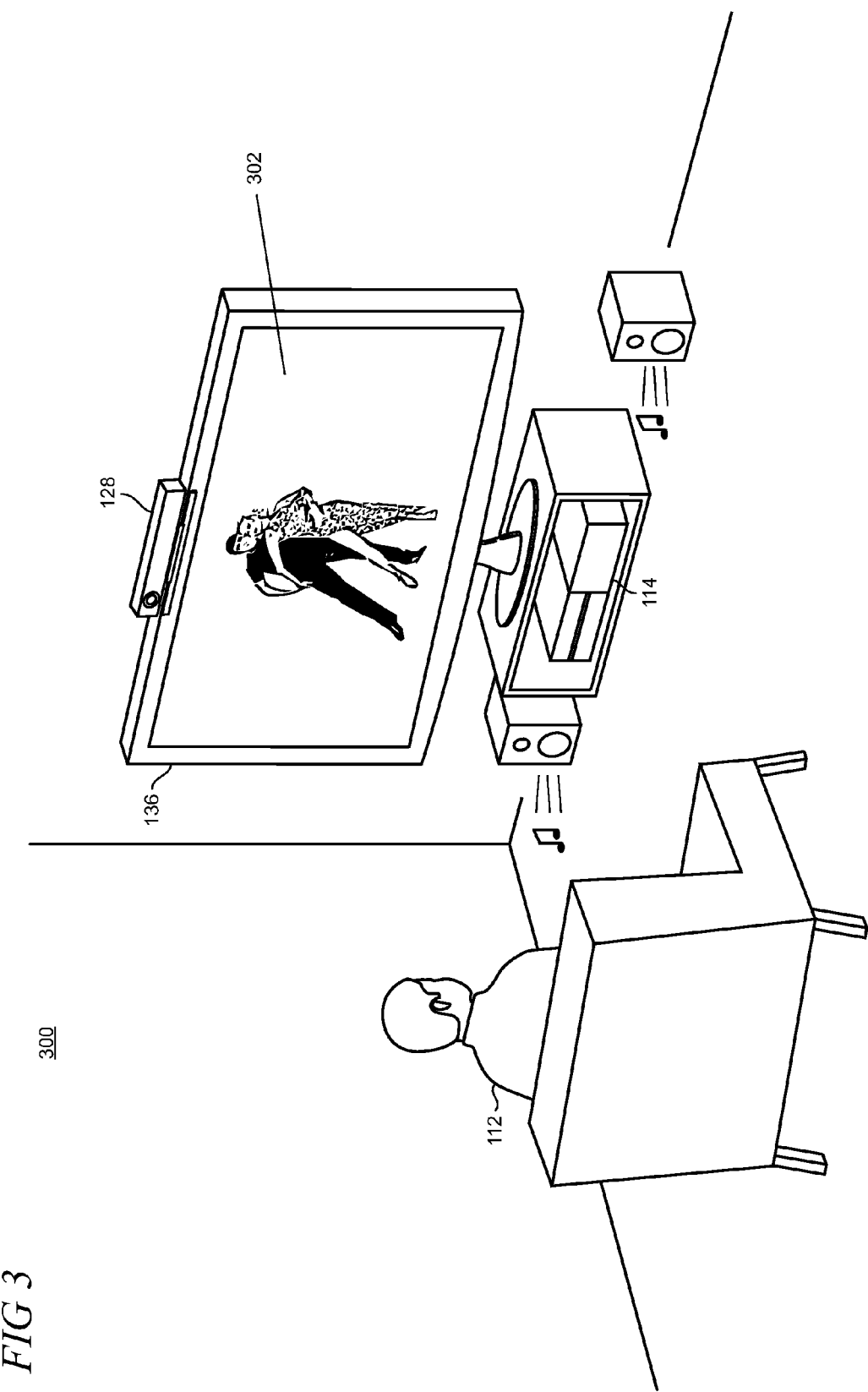
FIG. 3 shows a user watching a music video, the video having replaced corresponding audio content using the automapping feature of a unified catalog.

FIG. 3 shows an illustration 300 of a user 112 watching a music video 302 on a display device 136 that has been automatically and dynamically substituted for the corresponding music track in the user's collection or playlist.

Figure 4:
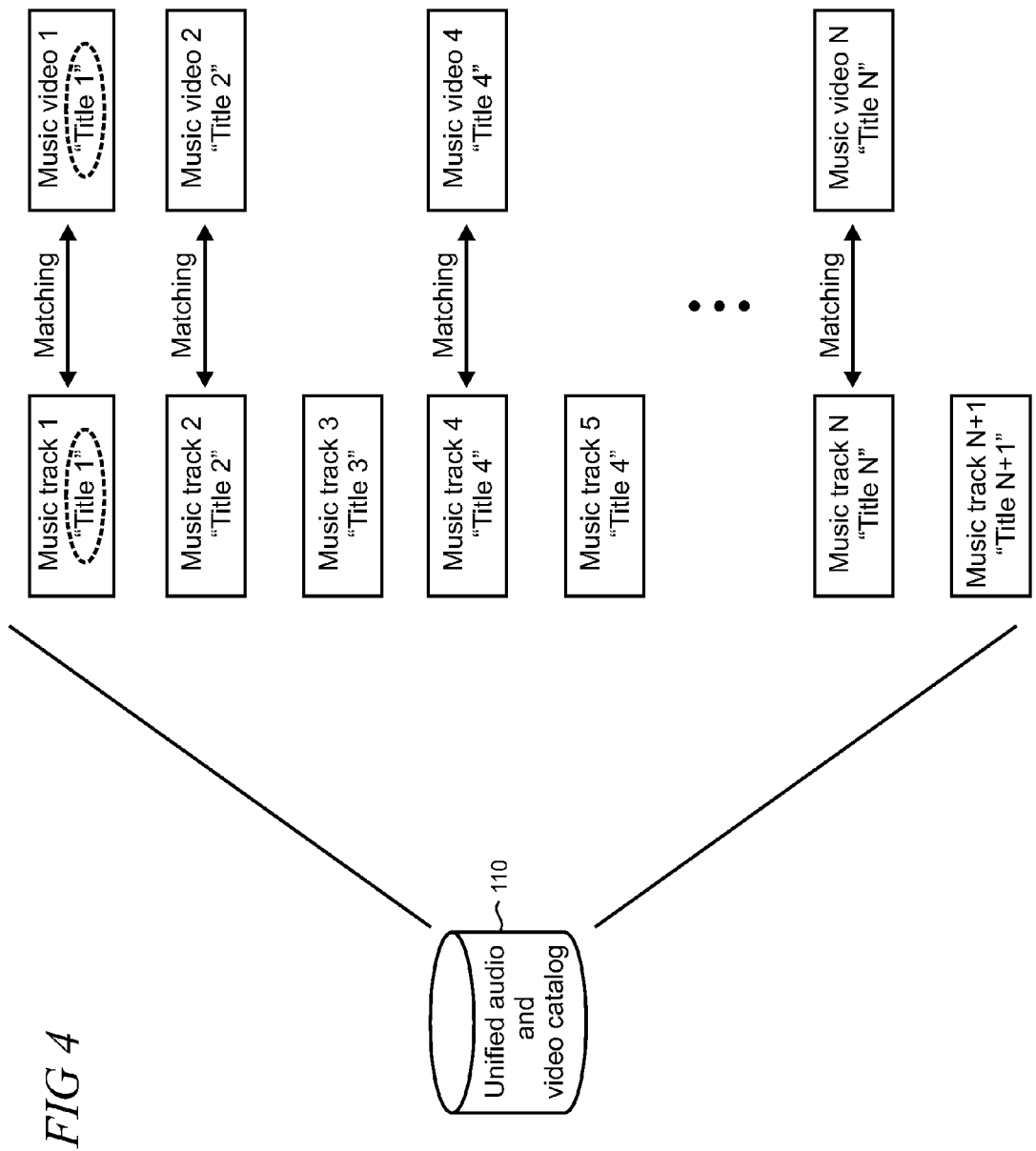
FIG. 4 shows a unified audio and video catalog in which some, but not all, of audio tracks have been mapped to matching music videos.

Turning to FIG. 4, an illustration of the unified audio and video catalog 110, on which music tracks and corresponding videos are mapped or matched to one another, is provided. In the illustrative example shown, a collection or playlist includes music tracks labeled as "music track 1" . . . "music track N+1". As shown, not all music tracks in the catalog 110 have matching video material. Only each of music tracks 1, 2, 4, and N are shown to have a corresponding video. Music tracks 3, 5 and N+1 do not have a corresponding video in catalog 110. In the exemplary catalog shown, the matching is done by song 'title', but it should be appreciated that any suitable mapping technique may be implemented. A determination as to whether a music video corresponds to a song may be based on any song identifier or on any other automapping technique.

Figure 5:
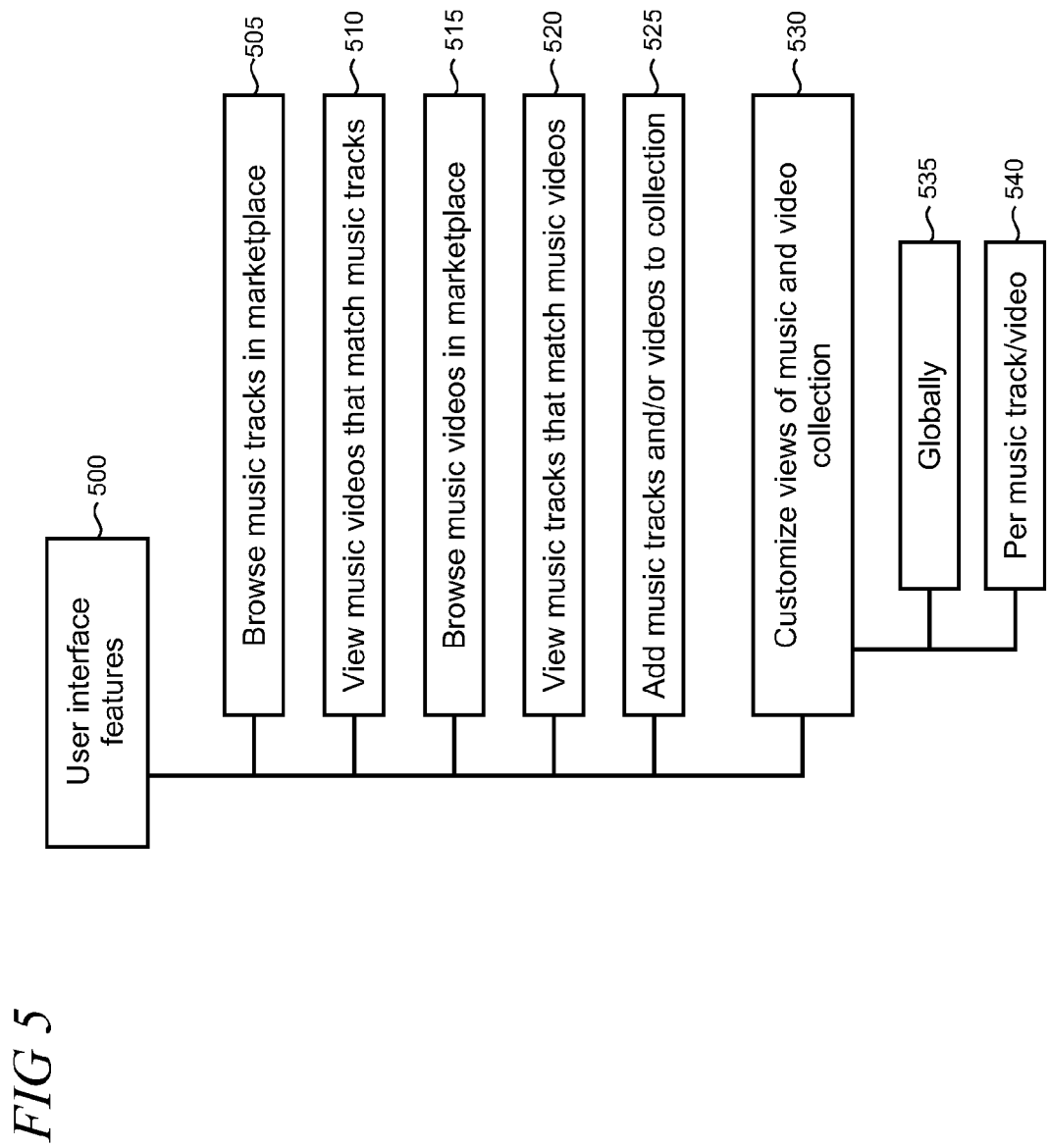
FIG. 5 shows illustrative user interface features that are supported by a media content application that executes on a multimedia console.

As noted above with regard to FIG. 1, media content app 138 executes on the multimedia console 114. As shown in FIG. 5, the media content app 138 is configured to provide a variety of user features when operating as a part of the system running on the multimedia console 114. Some of the experiences may execute simultaneously to implement multitasking in some cases. The user features include browsing/searching music tracks in a marketplace 505, viewing music videos that match music tracks 510, browsing/searching music videos in the marketplace 515, and viewing music tracks that match music videos 520. If a track or music video is returned in response to a search, an indication is also provided as to whether a corresponding music video or track exists in the unified catalog. The adding of music tracks and/or videos to the collection 525 is also supported.

The user interface features further include customizing views of one or more music and video collections 530. The customization of the viewing of videos includes the ability to globally select viewing preferences 535, including a selection to 'not' replace music tracks with any available corresponding video, or, to select a viewing preference in a per music track or video manner 540, in which a user may interact with the user interface to indicate that only a particular music track should not be replaced with its corresponding video(s). Alternatively, if the a global music video swap setting is off, and corresponding videos do not automatically replace corresponding music tracks, a user may interact with the user interface to indicate that one or more particular music tracks should be replaced with its corresponding video. The various user features may be activated through user interaction with the user interface. For example, the user interface could be configured to expose user-accessible controls to change tracks or playlists in the media content app that is running on the multimedia console. The user interface features 500 may further include interactive features in which the user 112 can push a button on controller 132 to launch or return to a home screen at any time during a session on the multimedia console 114. The user can also make a particular gesture that is captured by the camera system 128 and associated gesture recognition system that is implemented on the multimedia console 114, or speak a voice command.

Figure 6:
FIG. 6 shows an illustrative screenshot of an interactive user interface that supports the present automapping and video playback experiences.

FIG. 6 shows a screenshot 600 of an illustrative user interface UI implemented during use of entertainment service 102. Of course the particular screen shown in this example is intended to be illustrative and the user interfaces in various implementations of the present automapping of music tracks to music videos experience vary from what is shown by content, format, and layout according to particular needs. In addition, in the screenshot 600 and those that follow, the UIs shown have been simplified for clarity of exposition as black and white line drawings. The screenshot 600 in FIG. 6 shows that the user 110 has begun playback of an individual music track in the user's collection.

Additionally, it should be noted that various other information can also be displayed in addition to the music video. For example, various metadata associated with the music video can be displayed, such as the name of the artist that recorded the song in the music video, the name of the album on which the song is included, and so forth. Additional information can also be displayed, such as the length of the music video, the elapsed playback time of the music video, and so forth.

In addition to information such as the length of a song, and the current elapsed playback time of the song, various additional metadata may be displayed during playback of both audio and video, including a title of the song, the name of the artist that recorded the song, an album cover design of the album on which the song is included.

After the first track shown comes to an end, the next track in the playlist or collection starts automatically, and if a corresponding video is available, the video is automatically substituted for the music track so that the user 110 can watch the video on the home screen 605.

Figure 7:
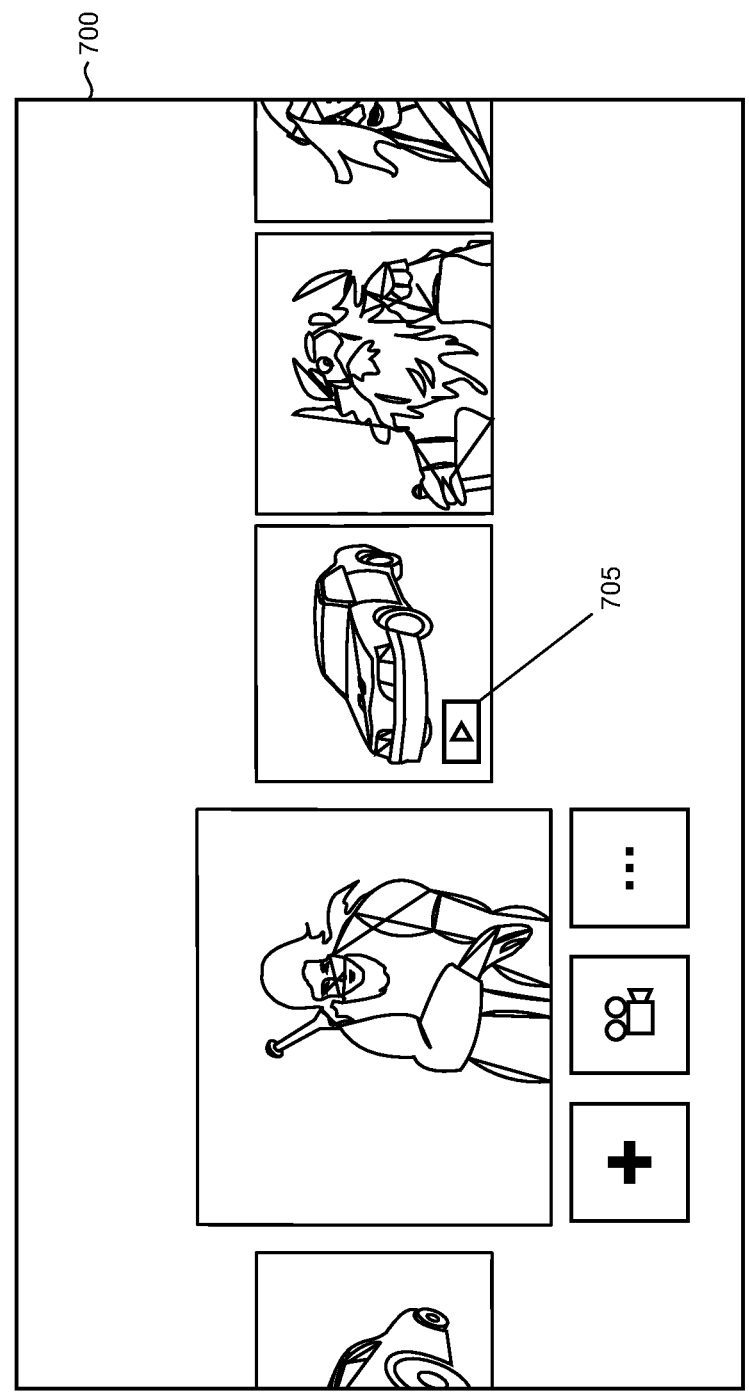
FIGS. 7-7A show illustrative screenshots of the user interface UI that supports browsing a collection in the present automapping of audio tracks to music content, and playback experience, including a visual representation of media content that has a corresponding video, and control features of video playback.

As illustrated in the illustrative screenshot of the user interface in FIG. 7, the user can view the entire 'now playing' playlist and also see which music tracks will play as a music track and which have a corresponding video available (as indicated by the glyph 705), and therefore the corresponding video will playback in place of the track. Alternatively, a playlist representation may be a list as a visual representation of each of the items in a playlist, for example showing each of the song titles on the playlist. Other information in addition to or in place of the song titles can also be included on playlist representation. A 'currently playing' song may be illustrated in some manner, such as having a different, or larger, outline than the other listed songs, or using different manners, such as using animations, different fonts or colors, displaying the song title or other data for only the currently playing song rather than other songs in the playlist, displaying a "now playing" icon or other indication, and so forth.

The displayed playlist may also include an indication of whether a music video or simply audio content will be played back for a particular song. This indication can take a variety of different forms, such as the glyph of the video camera shown beneath the currently playing video (of course the indication could be any indicator conveying a video representation, including an icon (for a video), and/or could be a different visual representation, for example, a 2×1 tile for a music video (a rectangle using the music video thumbnail), and a 1×1 the for a song (a square using albut art)) identifying songs for which music videos will be played back, and/or may include another icon (e.g., a disc, a microphone, etc.) identifying songs for which just audio content will be played back.

Alternatively, the indication can take different forms other than glyphs, such as particular text (e.g., "music video" or "audio"), different fonts or colors for music videos than for audio, different animations for music videos than for audio, and so forth.

Figure 7A:
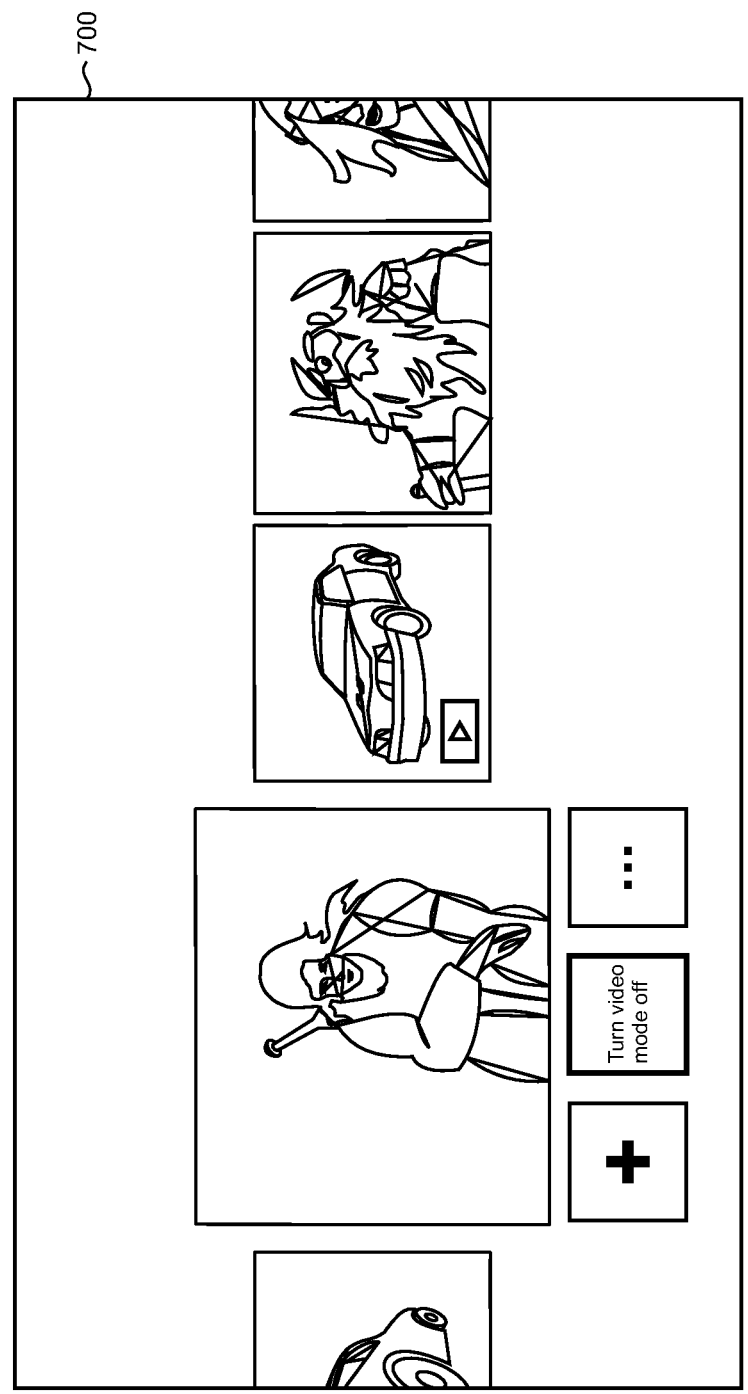

An additional feature available through the user interface 134, is the ability for the user 110 to interact with and/or control each of the corresponding videos shown on the illustrative screenshot 700 as shown in FIG. 7A, showing that the option to "turn video mode off" is presented. In this embodiment, a user may wish to prevent the media content app 138 and the unified audio and video catalog 110 from automatically and dynamically replacing audio tracks with corresponding videos.

Figure 8:
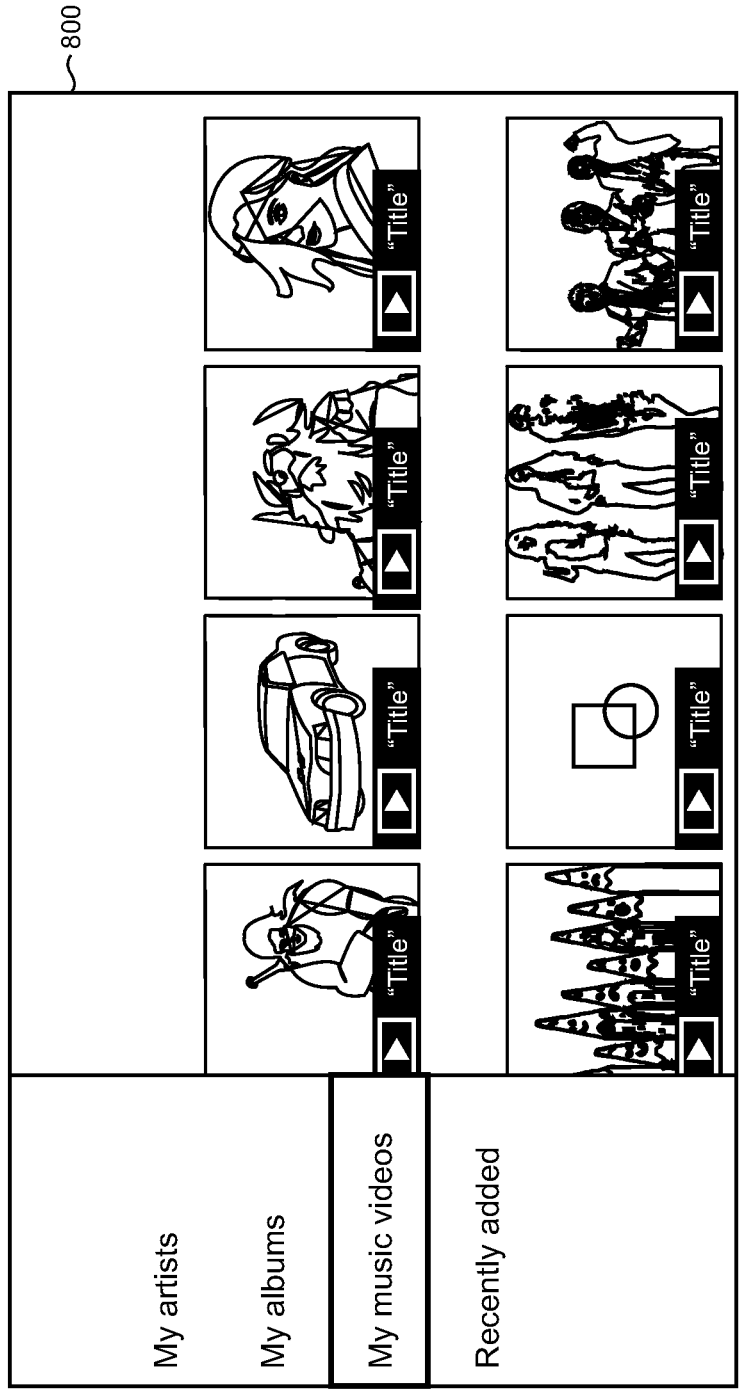
FIGS. 8-8A show illustrative screenshots of the user interface UI that supports browsing a user collection in the present automapping of audio tracks to music content, and playback experience.
Figure 8A:
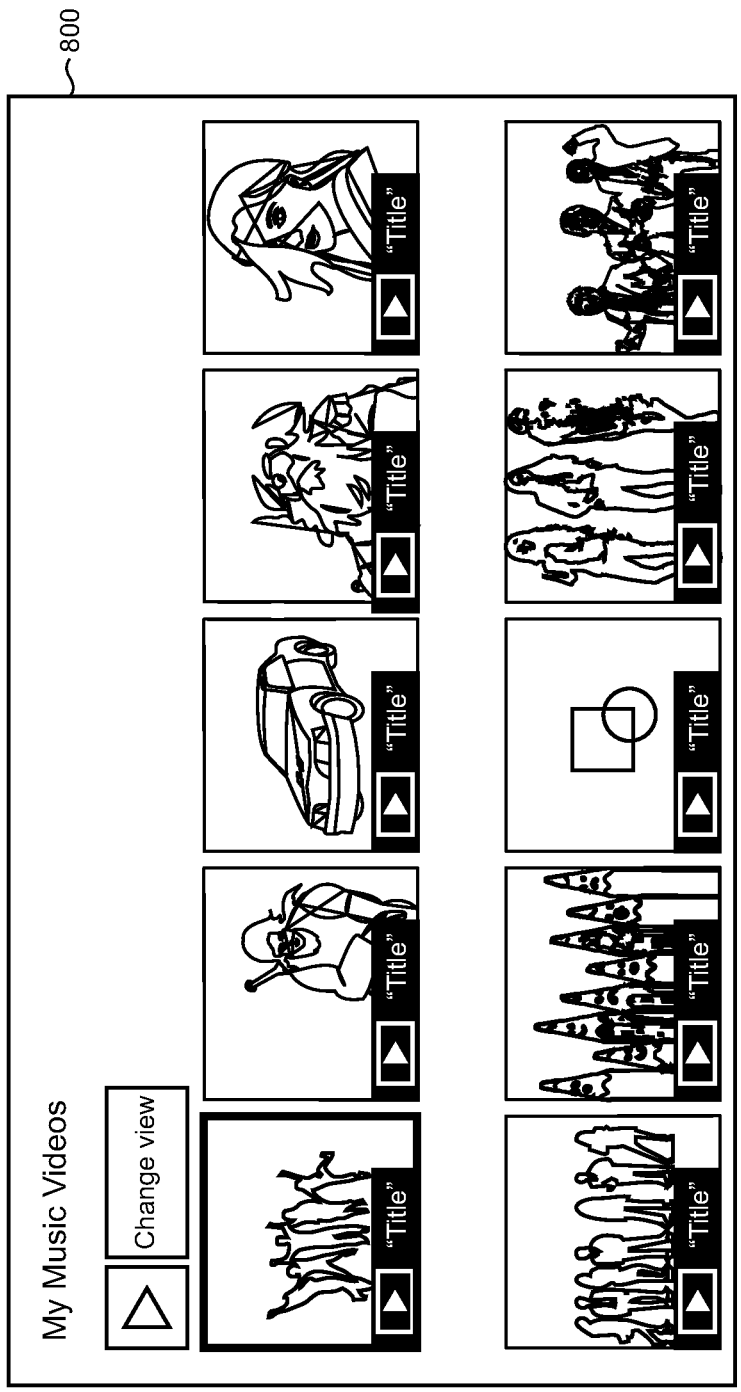

Still further, user 112 can browse all music in the unified catalog stored remotely in the cloud by genre, artist, or any other category. Alternatively, as shown in the illustrative UI screenshot 800 in FIG. 8, user 112 can browse the unified audio and video catalog 110 for only their collection or playlist by 'my music videos' (further illustrated in FIG. 8A). This does not require that the user add any videos to their collection, but rather provides an illustration of all video's available in the catalog stored in the cloud, corresponding to the user's collection of songs/tracks. Again, as illustrated, any of a variety of search criteria may be implemented, including search by artist, by album, by 'recently added', etc. The search results may include only the music tracks with corresponding videos available, or may include all music tracks, with an indication as to which have a corresponding video and which do not.

Upon startup of the multimedia console 114, a launch tile may be displayed for the music service. When a user wishes to access the music service, the application is launched from a user interface, for example, by activating the corresponding tile. Then, for example, the user may select 'add a playlist', name the list, and begin browsing the music already located on the user's device, and/or begin browsing 'all music' available to the user through the music service.

In some implementations, the media content app may scan the locally-stored user's music collection and match information found in the collection to the unified audio and video catalog stored remotely. If a match to the locally-stored audio or video content is found in the remote catalog, the corresponding music is tagged, and is made available to the user to stream from the remote catalog. Similarly, a search is performed by the media content app to determine if a corresponding music video may be found in the catalog remotely stored in the unified audio and video catalog.

Once the music service is launched, one or more rows of tiles may be illustrated, representing the music tracks included in the user's collection. The particular music tracks can be expected to change over time as the user adds tracks, deletes tracks and/or as videos become available for tracks included in the user's playlist. The tiles can also be used in some implementations to add a video to the playlist, to turn the video mode off for a corresponding music track, to control playback of the video, including pause, fast forward, rewind, etc, or to invoke any other feature.

A variety of different information describing a song or music video can be included as metadata associated with that song or music video. For example, the metadata associated with a song can include a title of the song, the name of an artist that recorded the song, the date the song was recorded, a song identifier, an album identifier of the album on which the song is included, a track identifier that identifies which track of the album the song is included as, and so forth. By way of another example, the metadata associated with a music video can include a title of the song in the music video, the name of an artist that recorded the song in the music video, the date the music video and/or song in the music video was recorded, a song identifier of the song in the music video, an album identifier of the album on which the song is included, a track identifier that identifies which track of the album the song in the music video is included as, specific music video metadata, such as the director of the music video, and so forth.

Figure 9:
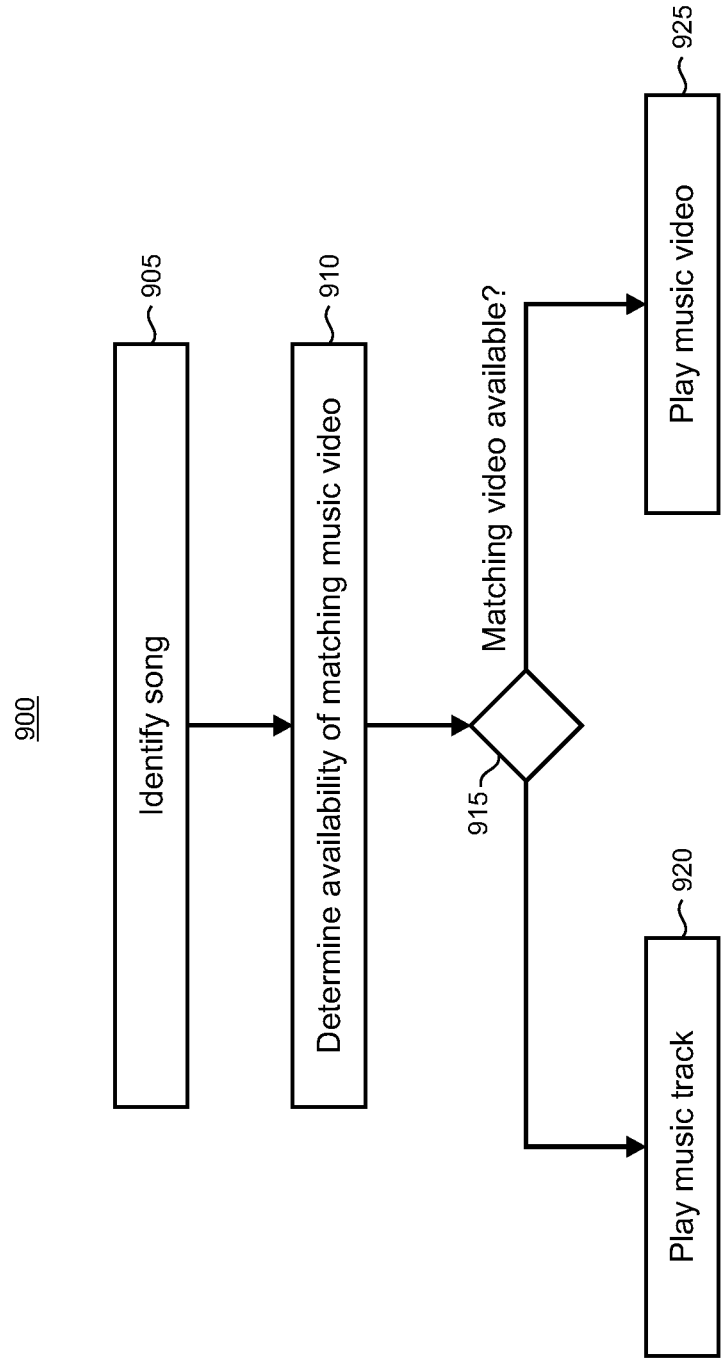
FIG. 9 is a flowchart of an exemplary method of using a unified audio and video catalog to substitute videos for corresponding audio tracks.

FIG. 9 is a flowchart illustrating an example method 900 automatically replacing audio content with corresponding video content, in the playback of a collection or playlist, using an automapping feature.

Process 900 is carried out in a computing environment, such as computing environment 100 of FIG. 1, and can be implemented in software, firmware, hardware, or combinations thereof. Process 900 is shown as a set of acts and is not limited to the order shown for performing the operations of the various acts. Process 900 is an example process for implementing the combining of song and music video playback using playlists; additional discussions include the auto-replacement of audio tracks with corresponding video content during playback of a playlist, utilizing a music service that implements automapping.

In process 900, a particular song is identified (act 905). The song may be identified by retrieving a song identifier of the song from a playlist or from another source (e.g., metadata associated with a file that is identified on the playlist), and/or audio characteristics of the file itself (i.e., an analysis of audio characteristics such as BPM, etc.). The song identifier can be a variety of different identifiers that allow the song to be uniquely distinguished from other songs. For example, different versions of the song sung by different artists have different song identifiers, a live version of the song and a studio-recorded version of the song by the same artist have different song identifiers, and so forth.

A determination is made as to whether a music video corresponding to the song is available as part of a unified catalog that automatically maps corresponding music videos with corresponding audio content (act 910).

Process 900 proceeds based on whether a music video corresponding to the song is available (act 915). If a music video corresponding to the song is not available, then the song is played back (act 920). This playback includes audibly playing the song, and can also include displaying other images or data regarding the song. For example, an album cover, picture of the artist, or other information maintained in the metadata associated with the song and/or album/artist can be displayed concurrently with playback of the song.

However, if a music video corresponding to the song is available, then the music video is played back instead of the song (act 925). In act 925 the song itself is not played back, but rather the music video (which does include audio) is played back—playback of the music video is automatically swapped for playback of the song. Thus, if the music video corresponding to the song is available, then the music video is played back (both audio and video content) rather than just playing back the song (just audio content).

Process 900 can be performed at different times. In one or more embodiments, process 900 is performed each time a playlist is selected for playback. The process can be performed, for example, when the playlist is initially selected or as the songs on the playlist are played. For example, just before the multimedia console 114 begins buffering or preloading a song for playback, the entertainment service checks the unified catalog to determine if a music video corresponding to the song has been mapped thereto. If the music video corresponding to the song has been mapped to the song, then the music video is played back instead of the song, but the playlist itself is not (but alternatively can be) modified. The playlist can be kept unaltered—continuing to include the song identifier even though the corresponding music video is automatically swapped for the song as the playlist is being played back. This enables a continuous experience with other devices and form factors that may not support a video experience. For example, a wearable device that does not support a video experience is able to continue playing only the audio of the song, rather than trying to play a corresponding available music video, and failing, as it is unable to do so.

It should be noted that the various playback controls typically associated with playback of audio content can be maintained, even though music videos are swapped for songs. For example, the user is still able to pause playback of the song or music video, resume playback of the song or music video, skip to the next entry on the playlist (which may be a song or automatically swapped for a music video), and so forth. Users can select these various playback controls by providing various user inputs.

In response to a playback request, the one or more songs and the one or more music videos on the playlist are played back. This playback includes audibly playing songs (and optionally displaying other images or data regarding the song, such as album cover, picture of the artist, or other information maintained in the metadata associated with the song), and audibly playing the audio content and displaying the video content of music videos. The audio and/or video content for the songs and music videos is streamed from the remote entertainment service.

In one or more embodiments, a user of the computing system implementing process 900 can disassociate or prevent the substitution of a video for a song, despite the automapping at the music service. In addition, the music service is able to adaptively implement default 'global settings' for the automatic substitution of videos for corresponding songs, depending upon the device/form factor being utilized. For example, on a media console located in the living room, the service may implement the default global setting to automatically substitute available videos for corresponding songs. On a cellular telephone, the service may implement a default global setting that does not automatically substitute available videos for corresponding songs, but rather presents the user with an option to choose to watch a corresponding video on demand (from a track). The default global setting for a screenless device, such as a wearable headset, may be one in which the automatic substitution of available videos for corresponding songs is turned off, and in which options for such substitution are not presented to the user in any manner.

In addition, the music service will not automatically substitute a video for a corresponding song, if the service determines that the app is playing music from the background (i.e., when another app is in the foreground of the device, and that other app is visible to the user). In that instance, the audio track is played (from the background) rather than playing the corresponding video. Once the user switches the music app to the foreground, the available videos corresponding to the songs in the playlist, will be substituted and played (in the foreground).

The user can disassociate music videos and songs in a variety of different manners. For example, the user can provide various different inputs signifying disassociation of a music video and song, such as selecting a button or menu item indicating to delete a particular association of a music video and song, selecting an "X" or delete option in a configuration screen, and so forth.

Figure 10:
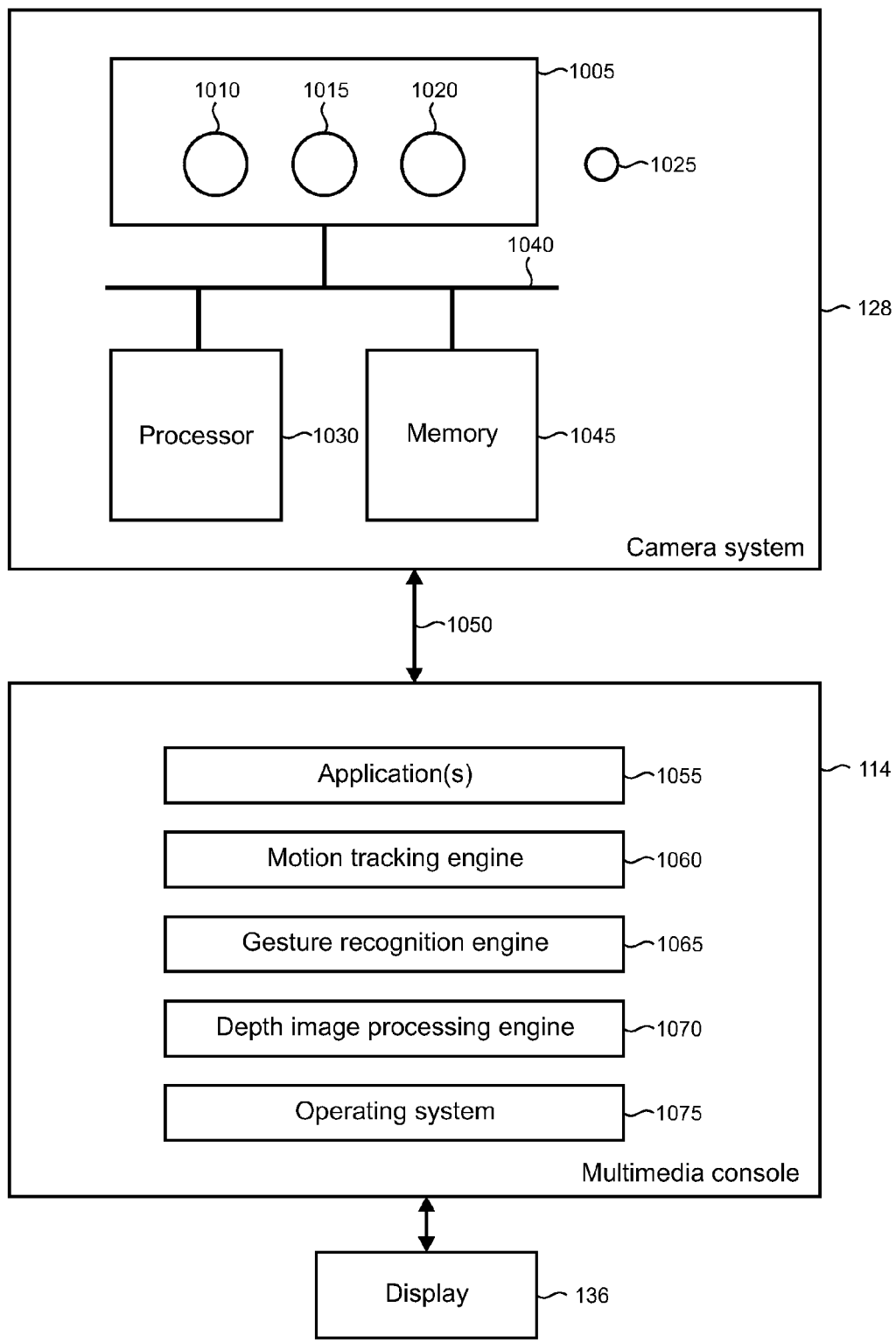
FIG. 10 shows a functional block diagram of a camera system that may be used as part of the user interface to interact with a unified audio and video catalog.

FIG. 10 shows illustrative functional components of the camera system 128 that may be used as part of a target recognition, analysis, and tracking system 1000 to recognize human and non-human targets in a capture area of a physical space monitored by the camera system without the use of special sensing devices attached to the subjects, uniquely identify them, and track them in three-dimensional space. The camera system 128 enables additional feature implementations for the automatic substitution of videos for corresponding songs. For example, if children are detected in the room, the system can automatically stop playing an inappropriate video, and switch to the corresponding song instead. These features assist in the enforcement of parental controls of video content, based upon feedback through the camera system 128.

The camera system 128 may be configured to capture video with depth information including a depth image that may include depth values via any suitable technique including, for example, time-of-flight, structured light, stereo image, or the like. In some implementations, the camera system 128 may organize the calculated depth information into "Z layers," or layers that may be perpendicular to a Z-axis extending from the depth camera along its line of sight.

As shown in FIG. 10, the camera system 128 includes an image camera component 1005. The image camera component 1005 may be configured to operate as a depth camera that may capture a depth image of a scene. The depth image may include a two-dimensional (2D) pixel area of the captured scene where each pixel in the 2D pixel area may represent a depth value such as a distance in, for example, centimeters, millimeters, or the like of an object in the captured scene from the camera. In this example, the image camera component 1005 includes an IR light component 1010, an IR camera 1015, and a visible light RGB camera 1020 that may be configured in an array, as shown, or in an alternative geometry.

Various techniques may be utilized to capture depth video frames. For example, in time-of-flight analysis, the IR light component 1010 of the camera system 128 may emit an infrared light onto the capture area and may then detect the backscattered light from the surface of one or more targets and objects in the capture area using, for example, the IR camera 1015 and/or the RGB camera 1020. In some embodiments, pulsed infrared light may be used such that the time between an outgoing light pulse and a corresponding incoming light pulse may be measured and used to determine a physical distance from the camera system 128 to a particular location on the targets or objects in the capture area. Additionally, the phase of the outgoing light wave may be compared to the phase of the incoming light wave to determine a phase shift. The phase shift may then be used to determine a physical distance from the capture device to a particular location on the targets or objects. Time-of-flight analysis may be used to indirectly determine a physical distance from the camera system 128 to a particular location on the targets or objects by analyzing the intensity of the reflected beam of light over time via various techniques including, for example, shuttered light pulse imaging.

In other implementations, the camera system 128 may use structured light to capture depth information. In such an analysis, patterned light (i.e., light displayed as a known pattern such as a grid pattern or a stripe pattern) may be projected onto the capture area via, for example, the IR light component 1010. Upon striking the surface of one or more targets or objects in the capture area, the pattern may become deformed in response. Such a deformation of the pattern may be captured by, for example, the IR camera 1015 and/or the RGB camera 1020 and may then be analyzed to determine a physical distance from the capture device to a particular location on the targets or objects.

The camera system 128 may utilize two or more physically separated cameras that may view a capture area from different angles, to obtain visual stereo data that may be resolved to generate depth information. Other types of depth image arrangements using single or multiple cameras can also be used to create a depth image. The camera system 128 may further include a microphone 1025. The microphone 1025 may include a transducer or sensor that may receive and convert sound into an electrical signal. The microphone 1025 may be used to reduce feedback between the camera system 128 and the multimedia console 112 in the target recognition, analysis, and tracking system 1000. Additionally, the microphone 1025 may be used to receive audio signals that may also be provided by the user 110 to control applications such as game applications, non-game applications, or the like that may be executed by the multimedia console 112.

The camera system 128 may further include a processor 1030 that may be in operative communication with the image camera component 1005 over a bus 1040. The processor 1030 may include a standardized processor, a specialized processor, a microprocessor, or the like that may execute instructions that may include instructions for storing profiles, receiving the depth image, determining whether a suitable target may be included in the depth image, converting the suitable target into a skeletal representation or model of the target, or any other suitable instruction. The camera system 128 may further include a memory component 1040 that may store the instructions that may be executed by the processor 1030, images or frames of images captured by the cameras, user profiles or any other suitable information, images, or the like. According to one example, the memory component 1040 may include RAM, ROM, cache, Flash memory, a hard disk, or any other suitable storage component. As shown in FIG. 10, the memory component 1040 may be a separate component in communication with the image capture component 1005 and the processor 1030. Alternatively, the memory component 1040 may be integrated into the processor 1030 and/or the image capture component 1005. In one embodiment, some or all of the components 1005, 1010, 1015, 1020, 1025, 1030, 1035, and 1040 of the capture device 128 are located in a single housing.

The camera system 128 operatively communicates with the multimedia console 114 over a communication link 1045. The communication link 1045 may be a wired connection including, for example, a USB (Universal Serial Bus) connection, a Firewire connection, an Ethernet cable connection, or the like and/or a wireless connection such as a wireless IEEE 802.11 connection. The multimedia console 114 can provide a clock to the camera system 128 that may be used to determine when to capture, for example, a scene via the communication link 1045. The camera system 128 may provide the depth information and images captured by, for example, the IR camera 1015 and/or the RGB camera 1020, including a skeletal model and/or facial tracking model that may be generated by the camera system 128, to the multimedia console 114 via the communication link 1045. The multimedia console 114 may then use the skeletal and/or facial tracking models, depth information, and captured images to, for example, create a virtual screen, adapt the user interface, and control apps/games 1050.

A motion tracking engine 1055 uses the skeletal and/or facial tracking models and the depth information to provide a control output to one more apps/games 1050 running on the multimedia console 114 to which the camera system 128 is coupled. The information may also be used by a gesture recognition engine 1060, depth image processing engine 1065, and/or operating system 1070.

The depth image processing engine 1065 uses the depth images to track motion of objects, such as the user and other objects. The depth image processing engine 1065 will typically report to the operating system 1070 an identification of each object detected and the location of the object for each frame. The operating system 1070 can use that information to update the position or movement of an avatar, for example, or other images shown on the display 136, or to perform an action on the user interface.

The gesture recognition engine 1060 may utilize a gestures library (not shown) that can include a collection of gesture filters, each comprising information concerning a gesture that may be performed, for example, by a skeletal model (as the user moves). The gesture recognition engine 1060 may compare the frames captured by the camera system 128 in the form of the skeletal model and movements associated with it to the gesture filters in the gesture library to identify when a user (as represented by the skeletal model) has performed one or more gestures. Those gestures may be associated with various controls of an application and direct the system to open the personalized home screen as described above. Thus, the multimedia console 114 may employ the gestures library to interpret movements of the skeletal model and to control an operating system or an application running on the multimedia console based on the movements.

In some implementations, various aspects of the functionalities provided by the apps/games 1050, motion tracking engine 1055, gesture recognition engine 1060, depth image processing engine 1065, and/or operating system 1070 may be directly implemented on the camera system 128 itself.

Figure 11:
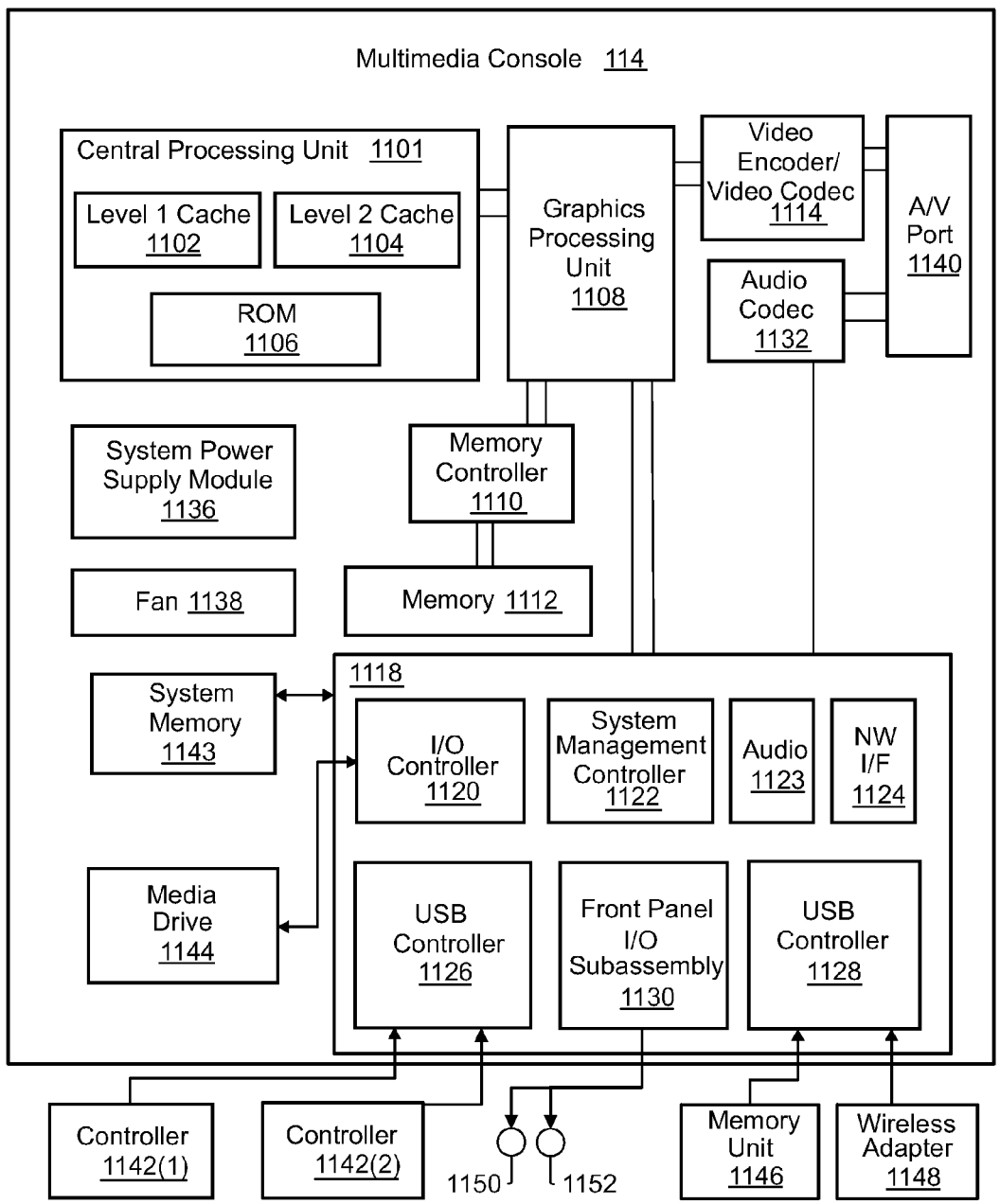
FIG. 11 shows a functional block diagram of an illustrative multimedia console as indicated in the computing environment of FIG. 1.

FIG. 11 is an illustrative functional block diagram of the multimedia console 114 shown in the drawings and described above. The multimedia console 114 has a central processing unit (CPU) 1101 having a level 1 cache 1102, a level 2 cache 1104, and a Flash ROM (Read Only Memory) 1106. The level 1 cache 1102 and the level 2 cache 1104 temporarily store data and hence reduce the number of memory access cycles, thereby improving processing speed and throughput. The CPU 1101 may be configured with more than one core, and thus, additional level 1 and level 2 caches 1102 and 1104. The Flash ROM 1106 may store executable code that is loaded during an initial phase of a boot process when the multimedia console 114 is powered ON.

A graphics processing unit (GPU) 1108 and a video encoder/video codec (coder/decoder) 1114 form a video processing pipeline for high speed and high resolution graphics processing. Data is carried from the GPU 1108 to the video encoder/video codec 1114 via a bus. The video processing pipeline outputs data to an A/V (audio/video) port 1140 for transmission to a television or other display. A memory controller 1110 is connected to the GPU 1108 to facilitate processor access to various types of memory 1112, such as, but not limited to, a RAM.

The multimedia console 114 includes an I/O controller 1120, a system management controller 1122, an audio processing unit 1123, a network interface controller 1124, a first USB (Universal Serial Bus) host controller 1126, a second USB controller 1128, and a front panel I/O subassembly 1130 that are preferably implemented on a module 1118. The USB controllers 1126 and 1128 serve as hosts for peripheral controllers 1142(1) and 1142(2), a wireless adapter 1148, and an external memory device 1146 (e.g., Flash memory, external CD/DVD ROM drive, removable media, etc.). The network interface controller 1124 and/or wireless adapter 1148 provide access to a network (e.g., the Internet, home network, etc.) and may be any of a wide variety of various wired or wireless adapter components including an Ethernet card, a modem, a Bluetooth module, a cable modem, or the like.

System memory 1143 is provided to store application data that is loaded during the boot process. A media drive 1144 is provided and may comprise a DVD/CD drive, hard drive, or other removable media drive, etc. The media drive 1144 may be internal or external to the multimedia console 114. Application data may be accessed via the media drive 1144 for execution, playback, etc. by the multimedia console 114. The media drive 1144 is connected to the I/O controller 1120 via a bus, such as a Serial ATA bus or other high speed connection (e.g., IEEE 1394).

The system management controller 1122 provides a variety of service functions related to assuring availability of the multimedia console 114. The audio processing unit 1123 and an audio codec 1132 form a corresponding audio processing pipeline with high fidelity and stereo processing. Audio data is carried between the audio processing unit 1123 and the audio codec 1132 via a communication link. The audio processing pipeline outputs data to the A/V port 1140 for reproduction by an external audio player or device having audio capabilities.

The front panel I/O subassembly 1130 supports the functionality of the power button 1150 and the eject button 1152, as well as any LEDs (light emitting diodes) or other indicators exposed on the outer surface of the multimedia console 114. A system power supply module 1136 provides power to the components of the multimedia console 114. A fan 1138 cools the circuitry within the multimedia console 114.

The CPU 1101, GPU 1108, memory controller 1110, and various other components within the multimedia console 114 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 114 is powered ON, application data may be loaded from the system memory 1143 into memory 1112 and/or caches 1102 and 1104 and executed on the CPU 1101. The application may present a graphical user interface that provides a consistent user experience when navigating to different media types available on the multimedia console 114. In operation, applications and/or other media contained within the media drive 1144 may be launched or played from the media drive 1144 to provide additional functionalities to the multimedia console 114.

The multimedia console 114 may be operated as a standalone system by simply connecting the system to a television or other display. In this standalone mode, the multimedia console 114 allows one or more users to interact with the system, watch movies, or listen to music. However, with the integration of broadband connectivity made available through the network interface controller 1124 or the wireless adapter 1148, the multimedia console 114 may further be operated as a participant in a larger network community.

When the multimedia console 114 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbps), etc. Because these resources are reserved at system boot time, the reserved resources do not exist from the application's view.

In particular, the memory reservation preferably is large enough to contain the launch kernel, concurrent system applications, and drivers. The CPU reservation is preferably constant such that if the reserved CPU usage is not used by the system applications, an idle thread will consume any unused cycles.

With regard to the GPU reservation, lightweight messages generated by the system applications (e.g., pop-ups) are displayed by using a GPU interrupt to schedule code to render pop-ups into an overlay. The amount of memory needed for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV re-sync is eliminated.

After the multimedia console 114 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 1101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 1142(1) and 1142(2)) are shared by gaming applications and system applications. The input devices are not reserved resources, but are to be switched between system applications and the gaming application such that each will have a focus of the device. The application manager preferably controls the switching of input stream, without knowledge of the gaming application's knowledge and a driver maintains state information regarding focus switches.

Figure 12:
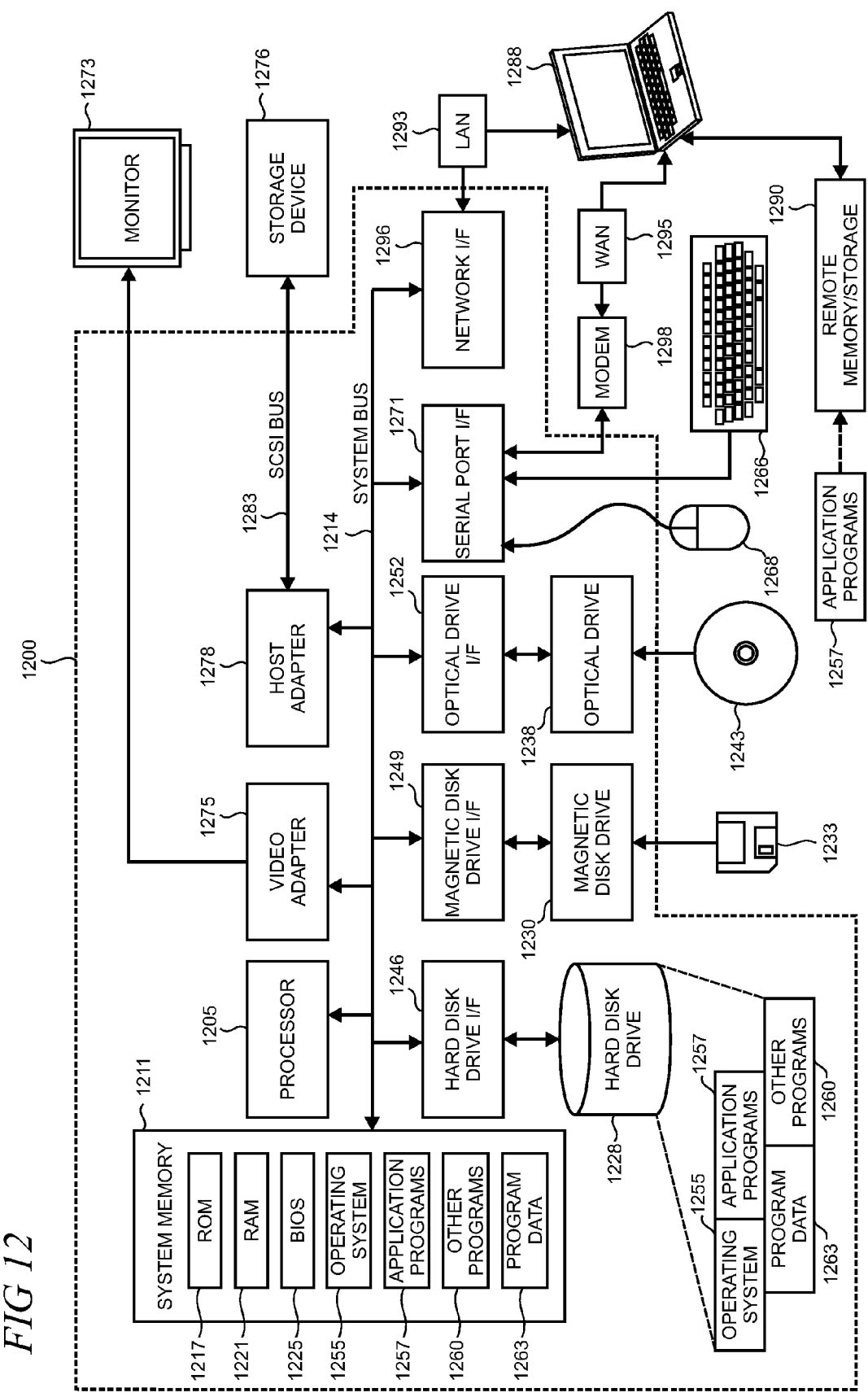
FIG. 12 is a simplified block diagram of an illustrative computer system such as a personal computer ("PC") or server that may be used in part to implement the present music track to music video automapping and substitution of corresponding video content for music tracks.

FIG. 12 is a simplified block diagram of an illustrative computer system 1200 such as a PC, client device, or server with which the present color to sound mapping may be implemented. Computer system 1200 includes a processing unit 1205, a system memory 1211, and a system bus 1214 that couples various system components including the system memory 1211 to the processing unit 1205. The system bus 1214 may be any of several types of bus structures including a memory bus or memory controller, a peripheral bus, and a local bus using any of a variety of bus architectures. The system memory 1211 includes read only memory ("ROM") 1217 and random access memory ("RAM") 1221. A basic input/output system ("BIOS") 1225, containing the basic routines that help to transfer information between elements within the computer system 1200, such as during startup, is stored in ROM 1217. The computer system 1200 may further include a hard disk drive 1228 for reading from and writing to an internally disposed hard disk (not shown), a magnetic disk drive 1230 for reading from or writing to a removable magnetic disk 1233 (e.g., a floppy disk), and an optical disk drive 1238 for reading from or writing to a removable optical disk 1243 such as a CD (compact disc), DVD (digital versatile disc), or other optical media. The hard disk drive 1228, magnetic disk drive 1230, and optical disk drive 1238 are connected to the system bus 1214 by a hard disk drive interface 1246, a magnetic disk drive interface 1249, and an optical drive interface 1252, respectively. The drives and their associated computer readable storage media provide non-volatile storage of computer readable instructions, data structures, program modules, and other data for the computer system 1200. Although this illustrative example shows a hard disk, a removable magnetic disk 1233, and a removable optical disk 1243, other types of computer readable storage media which can store data that is accessible by a computer such as magnetic cassettes, flash memory cards, digital video disks, data cartridges, random access memories ("RAMs"), read only memories ("ROMs"), and the like may also be used in some applications of the present color to sound mapping. In addition, as used herein, the term computer readable storage medium includes one or more instances of a media type (e.g., one or more magnetic disks, one or more CDs, etc.). For purposes of this specification and the claims, the phrase "computer-readable storage media" and variations thereof, does not include waves, signals, and/or other transitory and/or intangible communication media.

A number of program modules may be stored on the hard disk, magnetic disk 1233, optical disk 1243, ROM 1217, or RAM 1221, including an operating system 1255, one or more application programs 1257, other program modules 1260, and program data 1263. A user may enter commands and information into the computer system 1200 through input devices such as a keyboard 1266 and pointing device 1268 such as a mouse. Other input devices (not shown) may include a microphone, joystick, game pad, satellite dish, scanner, trackball, touchpad, touch screen, touch-sensitive module or device, gesture-recognition module or device, voice recognition module or device, voice command module or device, or the like. These and other input devices are often connected to the processing unit 1205 through a serial port interface 1271 that is coupled to the system bus 1214, but may be connected by other interfaces, such as a parallel port, game port, or USB. A monitor 1273 or other type of display device is also connected to the system bus 1214 via an interface, such as a video adapter 1275. In addition to the monitor 1273, personal computers typically include other peripheral output devices (not shown), such as speakers and printers. The illustrative example shown in FIG. 12 also includes a host adapter 1278, a Small Computer System Interface ("SCSI") bus 1283, and an external storage device 1276 connected to the SCSI bus 1283.

The computer system 1200 is operable in a networked environment using logical connections to one or more remote computers, such as a remote computer 1288. The remote computer 1288 may be selected as another personal computer, a server, a router, a network PC, a peer device, or other common network node, and typically includes many or all of the elements described above relative to the computer system 1200, although only a single representative remote memory/storage device 1290 is shown in FIG. 12. The logical connections depicted in FIG. 12 include a local area network ("LAN") 1293 and a wide area network ("WAN") 1295. Such networking environments are often deployed, for example, in offices, enterprise-wide computer networks, intranets, and the Internet.

When used in a LAN networking environment, the computer system 1200 is connected to the local area network 1293 through a network interface or adapter 1296. When used in a WAN networking environment, the computer system 1200 typically includes a broadband modem 1298, network gateway, or other means for establishing communications over the wide area network 1295, such as the Internet. The broadband modem 1298, which may be internal or external, is connected to the system bus 1214 via a serial port interface 1271. In a networked environment, program modules related to the computer system 1200, or portions thereof, may be stored in the remote memory storage device 3090. It is noted that the network connections shown in FIG. 12 are illustrative and other means of establishing a communications link between the computers may be used depending on the specific requirements of an application of the present color to sound mapping. It may be desirable and/or advantageous to enable other types of computing platforms other than the multimedia console 114 to implement the present color to sound mapping in some applications.

Figure 13:
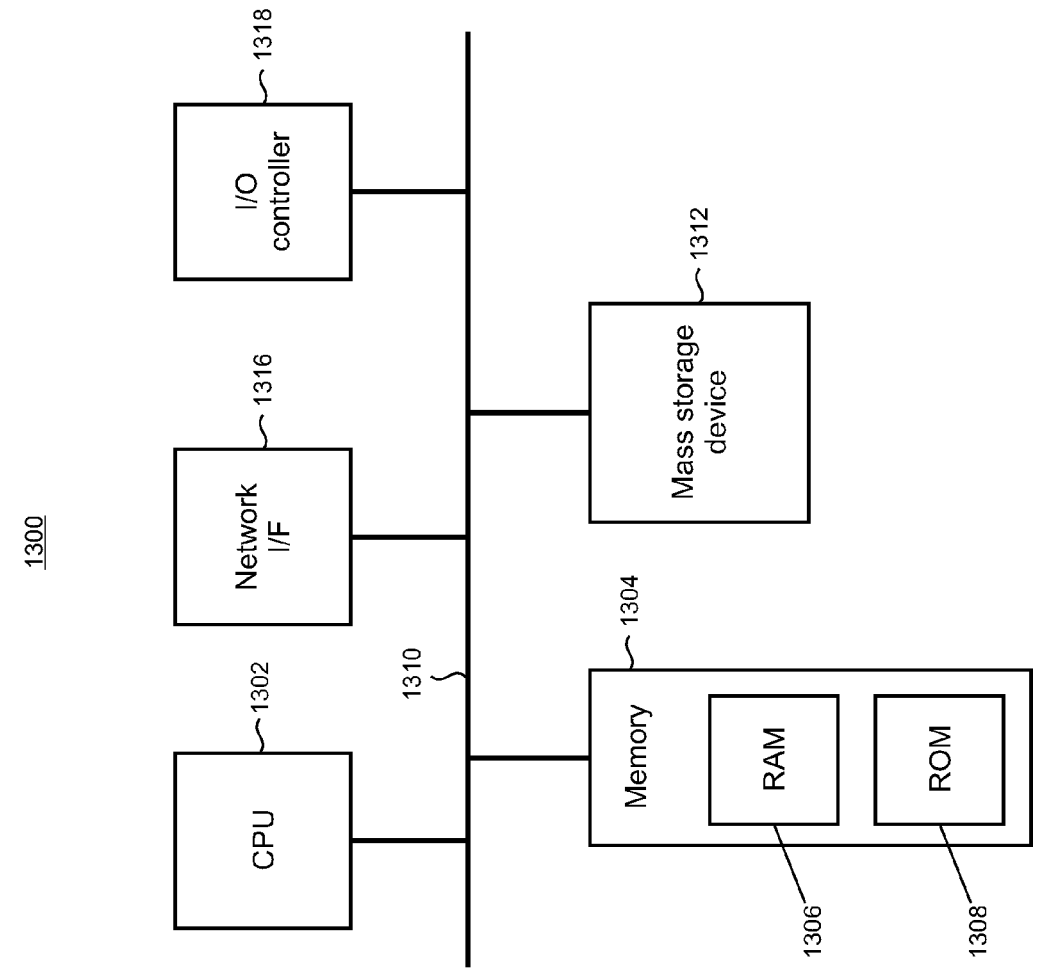
FIG. 13 shows a block diagram of an illustrative computing platform that may be used in part to implement the present music track to music video automapping.

FIG. 13 shows an illustrative architecture 1300 for a computing platform or device capable of executing the various components described herein for color to sound mapping. Thus, the architecture 1300 illustrated in FIG. 13 shows an architecture that may be adapted for a server computer, mobile phone, a PDA (personal digital assistant), a smartphone, a desktop computer, a netbook computer, a tablet computer, GPS (Global Positioning System) device, gaming console, and/or a laptop computer. The architecture 1300 may be utilized to execute any aspect of the components presented herein.

The architecture 1300 illustrated in FIG. 13 includes a CPU 1302, a system memory 1304, including a RAM 1306 and a ROM 1308, and a system bus 1310 that couples the memory 1304 to the CPU 1302. A basic input/output system containing the basic routines that help to transfer information between elements within the architecture 1300, such as during startup, is stored in the ROM 1308. The architecture 1300 further includes a mass storage device 1312 for storing software code or other computer-executed code that is utilized to implement applications, the file system, and the operating system.

The mass storage device 1312 is connected to the CPU 1302 through a mass storage controller (not shown) connected to the bus 1310. The mass storage device 1312 and its associated computer-readable storage media provide non-volatile storage for the architecture 1300. Although the description of computer-readable storage media contained herein refers to a mass storage device, such as a hard disk or CD-ROM drive, it should be appreciated by those skilled in the art that computer-readable media can be any available computer storage media that can be accessed by the architecture 1300.

By way of example, and not limitation, computer-readable storage media may include volatile and non-volatile, removable and non-removable media implemented in any method or technology for storage of information such as computer-readable instructions, data structures, program modules or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), BLU-RAY, or other optical storage, magnetic cassettes, magnetic tape, magnetic disk storage or other magnetic storage devices, or any other medium which can be used to store the desired information and which can be accessed by the architecture 1300.

According to various embodiments, the architecture 1300 may operate in a networked environment using logical connections to remote computers through a network. The architecture 1300 may connect to the network through a network interface unit 1316 connected to the bus 1310. It should be appreciated that the network interface unit 1316 also may be utilized to connect to other types of networks and remote computer systems. The architecture 1300 also may include an input/output controller 1318 for receiving and processing input from a number of other devices, including a keyboard, mouse, or electronic stylus (not shown in FIG. 13). Similarly, the input/output controller 1318 may provide output to a display screen, a printer, or other type of output device (also not shown in FIG. 13).

It should be appreciated that the software components described herein may, when loaded into the CPU 1302 and executed, transform the CPU 1302 and the overall architecture 1300 from a general-purpose computing system into a special-purpose computing system customized to facilitate the functionality presented herein. The CPU 1302 may be constructed from any number of transistors or other discrete circuit elements, which may individually or collectively assume any number of states. More specifically, the CPU 1302 may operate as a finite-state machine, in response to executable instructions contained within the software modules disclosed herein. These computer-executable instructions may transform the CPU 1302 by specifying how the CPU 1302 transitions between states, thereby transforming the transistors or other discrete hardware elements constituting the CPU 1302.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the architecture 1300 in order to store and execute the software components presented herein. It also should be appreciated that the architecture 1300 may include other types of computing devices, including hand-held computers, embedded computer systems, smartphones, PDAs, and other types of computing devices known to those skilled in the art. It is also contemplated that the architecture 1300 may not include all of the components shown in FIG. 13, may include other components that are not explicitly shown in FIG. 13, or may utilize an architecture completely different from that shown in FIG. 13.

Based on the foregoing, it should be appreciated that technologies for audio track to video content mapping, and for the dynamic replacement of audio tracks with corresponding videos from a unified audio and video catalog, have been disclosed herein. Although the subject matter presented herein has been described in language specific to computer structural features, methodological and transformative acts, specific computing machinery, and computer-readable storage media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed:

1. A method of remotely providing a music service that identifies matching video and music content to a user at a local client device, comprising:

analyzing a collection of audio content associated with the user, the audio content collection being either i) stored locally on the local client device, ii) stored remotely from the local client device in a store that is accessible by the music service, or) stored using a combination of local and remote storage;

receiving a playlist from the user at the local client device, the playlist identifying a plurality of audio content items from the user's collection of audio content and further identifying a playback order of the audio content items on the local client device;

receiving an identification of a piece of media content associated with the user at the local client device, the selected piece of media content being included in a unified catalog of video and music content that is accessible by the music service, portions of the unified catalog having two matching members in which one of the matching members is video content and another of the matching members is audio content;

retrieving from a unified catalog, an identification of a matching member to the piece of media content;

using the retrieved identification of the matching member to the piece of media content to provide a user experience for the user at the local client device; and during runtime dynamically replacing an audio content item in the playlist with matching video content.

2. The method of claim 1 in which matching members share at least one matching criteria, the matching criteria including at least title.

3. The method of claim 1 further including performing the replacing during runtime of the playlist playback on the local client device.

4. The method of claim 1 further including providing a media content marketplace that is browsable by the user at the local client device, the media content marketplace offering media content from the unified catalog for consumption by the user at the local client device.

5. The method of claim 1 further including receiving input from the user at the local client device comprising browsing commands for navigating the media content marketplace and making selections of particular pieces of media content from the unified catalog, and responsively to the received input, displaying at least one matching member to the selected media content to the user at the local client device.

6. An apparatus, comprising:

one or more processors;

a display that supports a user interface (UI); and a hardware memory device storing computer-readable instructions which, when executed by the one or more processors, cause the apparatus to:

capture an input from the user that identifies a piece of media content, the piece of audio content being either audio content or video content, send the captured input to a remote service for processing, the processing including searching a unified catalog of video and music content that is accessible by the remote service, portions of the unified catalog having two matching members in which one of the matching members is video content and another of the matching members is audio content, receive from the remote service, an identification of a matching member to the piece of media content, and use the identification of the matching member in a presentation supported on the UI as part of the user experience, wherein the matching member dynamically replaces the piece of media content during playback of a collection of a plurality of media content items that includes the piece of media content.

7. The apparatus of claim 6 in which the captured input pertains to an action performed by the user for one of creating a playlist, making a playlist, or browsing an online catalog of media content.

8. The apparatus of claim 7 further wherein the computer-readable instructions when executed by the one or more processors cause the apparatus to arrange the presentation to display media content from the unified catalog that is available for consumption by the user using the apparatus.

9. The apparatus of claim 8 further wherein the computer-readable instructions when executed by the one or more processors cause the apparatus to configure the presentation to show the playlist of media content on the UI, the UI supporting at least one of: i) iconography to indicate those pieces of media content in the playlist which comprise audio content and those pieces of media content in the playlist which comprise video content, or, ii) a presentation form that indicates availability of media content as video.

10. The apparatus of claim 8 wherein the computer-readable instructions when executed by the one or more processors cause the apparatus to configure the presentation to show the browsable online catalog on the GUI, the GUI including iconography to indicate those pieces of media content in the catalog which comprise audio content and those pieces of media content in the playlist which comprise video content.

11. The apparatus of claim 10 further wherein the computer-readable instructions when executed by the one or more processors cause the apparatus to include one of: i) provide a control for the user to selectively control whether available video content is displayed in the presentation, or ii) configure video content availability according to a form factor of the apparatus.

12. The apparatus of claim 6 further wherein the computer-readable instructions when executed by the one or more processors cause the apparatus to receive a selection from the user of a piece of media content for playback on the apparatus and playing the selected piece of media content.

13. The apparatus of claim 6 further including an optical sensor for capturing the input as one or more observed gestures performed by the user.

14. A hardware memory device including computer-readable instructions which, when executed by one or more processors in an electronic device, cause the device to:

access a unified catalog of video and music content, portions of the unified catalog having two matching members in which one of the matching members is video content and another of the matching members is audio content, the members being matched when sharing common criteria including content title or content name;

search the unified catalog to locate a matching member to a given piece of media content, the given piece of media content being either audio content or video content and being part of a collection of media content comprising a plurality of media content items specified by a user;

if a matching member to the given piece of media content is located, identify the located matching member;

use the identification to replace the given piece of media content with the located matching member during playback of the collection of media content, wherein the given piece of media content comprises audio content and matching video content is utilized to replace the audio content dynamically during playback of the collection of media content so that the video content plays in lieu of the audio content.

15. The hardware memory device of claim 14 wherein the computer-readable instructions when executed by the one or more processors cause the device to receive an input from the user that indicates a selection of a piece of video content, and use the identification to populate matching audio content into a graphical user interface (GUI) accessible by the user.

16. The hardware memory device of claim 15 wherein the computer-readable instructions when executed by the one or more processors cause the device to populate additional related information pertaining to the matching audio content in the GUI, the additional related information including at least one of album, artist, or other media content by the artist.

\* \* \* \* \*